(12) United States Patent
Modler et al.

(10) Patent No.: US 8,298,042 B2
(45) Date of Patent: Oct. 30, 2012

(54) WIRE MONITORING

(75) Inventors: Jens Modler, Flöha (DE); Axel Kubin, Dresden (DE)

(73) Assignee: Deutsche Solar GmbH, Freiberg/Sachsen (DE)

( * ) Notice: Subject to any disclaimer, the term of this patent is extended or adjusted under 35 U.S.C. 154(b) by 422 days.

(21) Appl. No.: 12/539,874

(22) Filed: Aug. 12, 2009

(65) Prior Publication Data
US 2010/0051009 A1 Mar. 4, 2010

(30) Foreign Application Priority Data
Aug. 28, 2008 (DE) .......................... 10 2008 044 805

(51) Int. Cl.
*B24B 49/00* (2006.01)

(52) U.S. Cl. .............................................. 451/8; 125/21

(58) Field of Classification Search .................... 125/21; 451/6, 8
See application file for complete search history.

(56) References Cited

U.S. PATENT DOCUMENTS

| | | | | |
|---|---|---|---|---|
| 4,228,782 A | * | 10/1980 | Demers et al. | .................. 125/14 |
| 5,908,025 A | * | 6/1999 | Katamachi | ................. 125/16.02 |
| 6,050,254 A | | 4/2000 | Egglhuber | |
| 2009/0320658 A1 | * | 12/2009 | Yazawa et al. | .................... 83/13 |

FOREIGN PATENT DOCUMENTS

DE          10220640 A1 * 12/2002

* cited by examiner

*Primary Examiner* — Maurina Rachuba
(74) *Attorney, Agent, or Firm* — McGlew and Tuttle, P.C.

(57) ABSTRACT

A sawing device for sawing silicon blocks comprises at least one cutting element for sawing silicon blocks, the cutting element being drivable by means of a drive device, at least one guide device, with the at least one cutting element being alignable along a predetermined path by means of the at least one guide device, and at least one monitoring device for monitoring the position of the at least one cutting element.

14 Claims, 7 Drawing Sheets

WIRE MONITORING

BACKGROUND OF THE INVENTION

1. Field of the Invention

The invention relates to a sawing device for sawing silicon blocks. The invention further relates to a method of sawing silicon blocks.

2. Background Art

There is a process step in the fabrication process for the wafer production where silicon blocks need to be cut into columns. This is for instance performed by means of a wire saw. The exact alignment of the sawing wire is a prerequisite in order to obtain columns with the correct dimensions. The exact alignment of the sawing wire is however time-consuming and prone to errors.

SUMMARY OF THE INVENTION

It is therefore the object of the present invention to improve a sawing device for sawing silicon blocks. This object is achieved by a sawing device for sawing silicon blocks, the sawing device comprising at least one cutting element for sawing silicon blocks which is drivable by means of a drive device, at least one guide device, with the at least one cutting element being alignable along a predetermined path by means of the at least one guide device, and at least one monitoring device for monitoring the position of the at least one cutting element.

This object is further achieved by a method of sawing silicon blocks, the method comprising the steps of providing a sawing device comprising guide rollers on which are arranged several guide grooves for positioning a cutting wire and at least one monitoring device for monitoring the position of the cutting wire, setting the at least one monitoring device to a definable desired position, placing the cutting wire on the guide rollers, and generating a signal by means of the monitoring device depending on the detected position of the at least one cutting element.

The gist of the invention is to monitor the position of the sawing wire by means of a monitoring device. This relieves the user of the sawing device of a considerable amount of work. Positioning of the sawing wire can be performed and monitored faster and more reliably.

Features and details of the invention will become apparent from the description of an embodiment by means of the drawing.

DESCRIPTION OF THE PREFERRED EMBODIMENT

Figure 1:
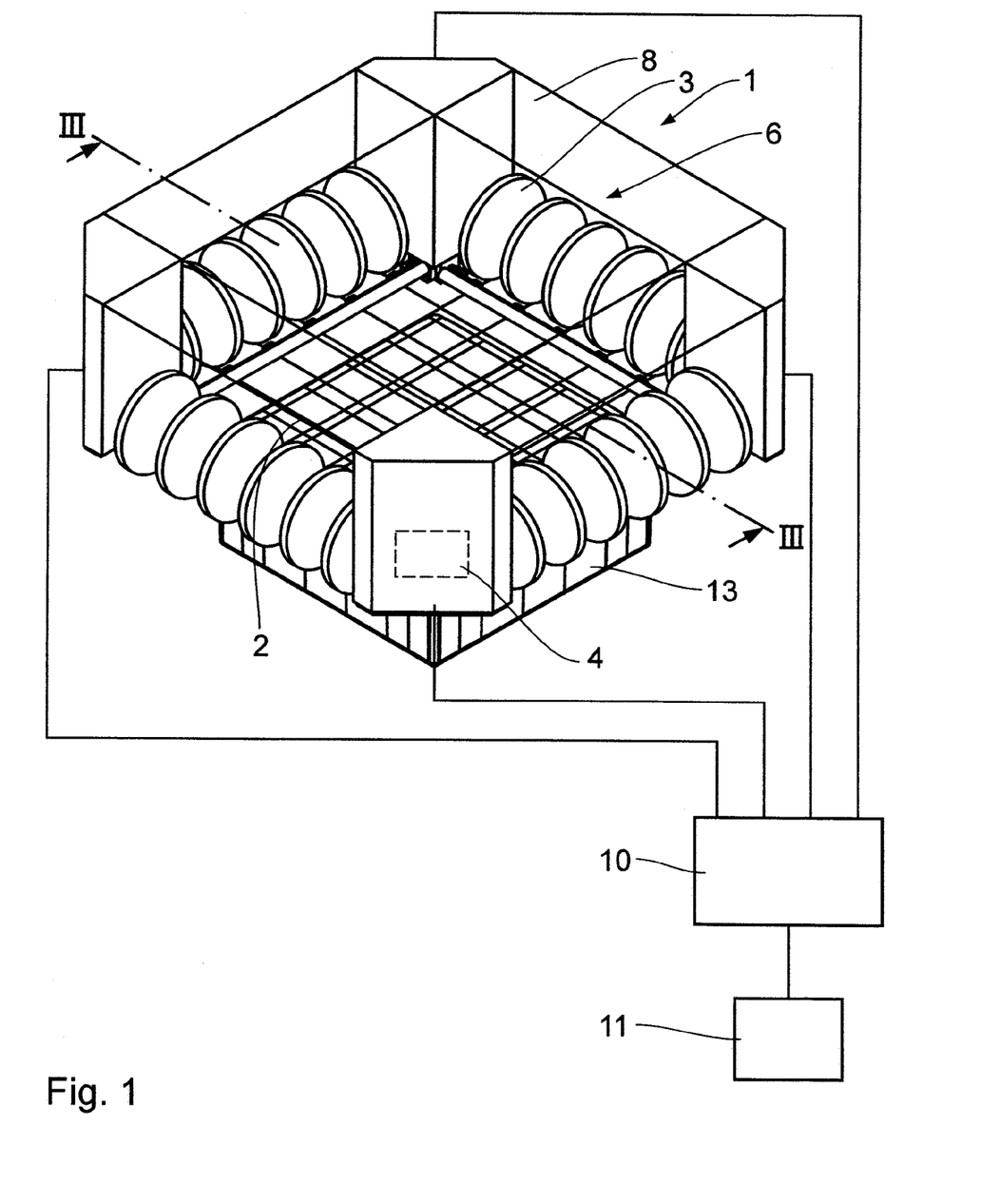
FIG. 1 is an illustration of the sawing device according to a first embodiment comprising a diagrammatically illustrated control device.
Figure 2:
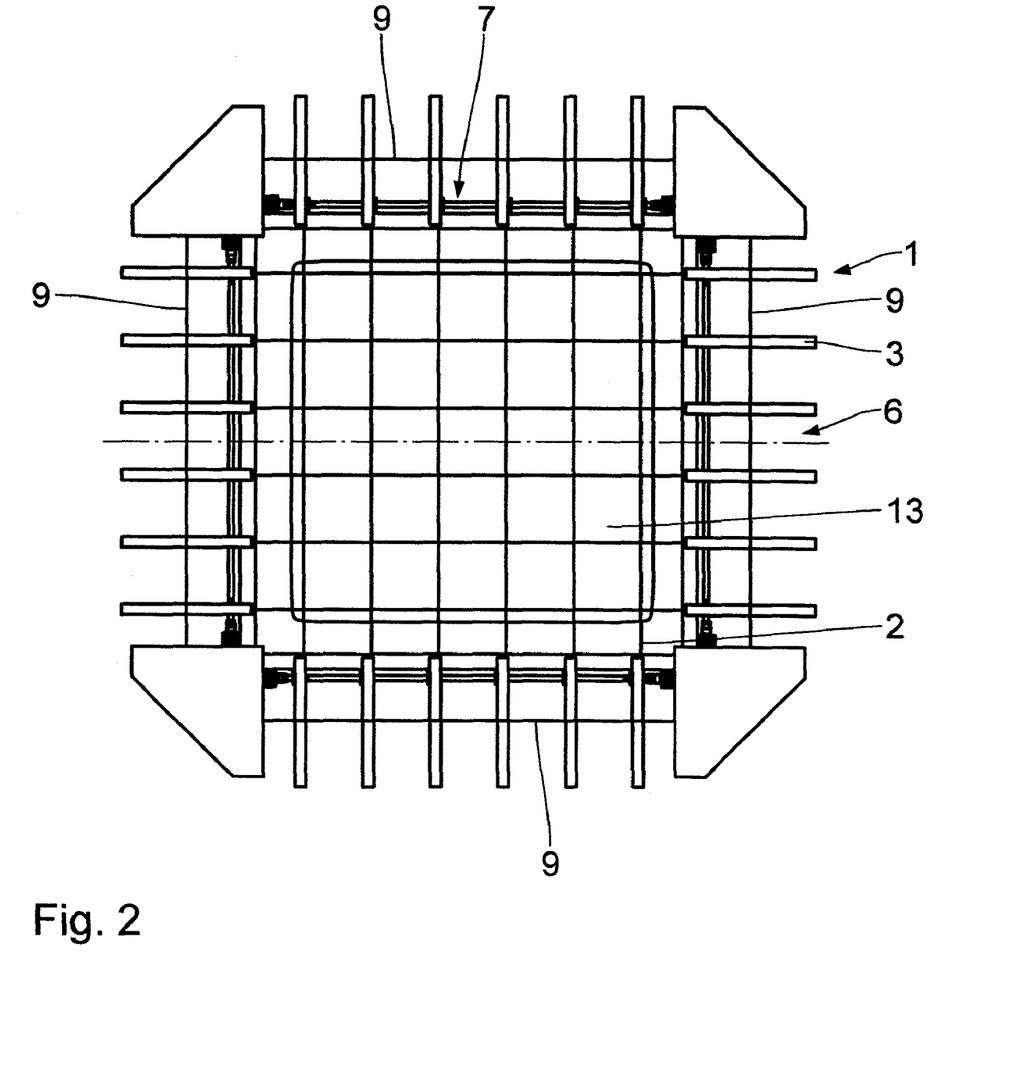
FIG. 2 is a plan view of the embodiment according to FIG. 1.

A sawing device 1 for sawing silicon blocks, which are also referred to as ingots 13, comprises a frame 8 on which are mounted several guide rollers 3. The frame 8 has a rectangular, in particular a square cross-section. A rotatable, in particular rotatably drivable guide shaft 9 on which are arranged several guide rollers 3 is in each case arranged on one of the sides of the frame 8. At least three, in particular at least five, preferably at least six guide rollers 3 are in each case arranged on each guide shaft 9.

The guide rollers 3 are preferably arranged equidistantly on the guide shafts 9.

Figure 5:
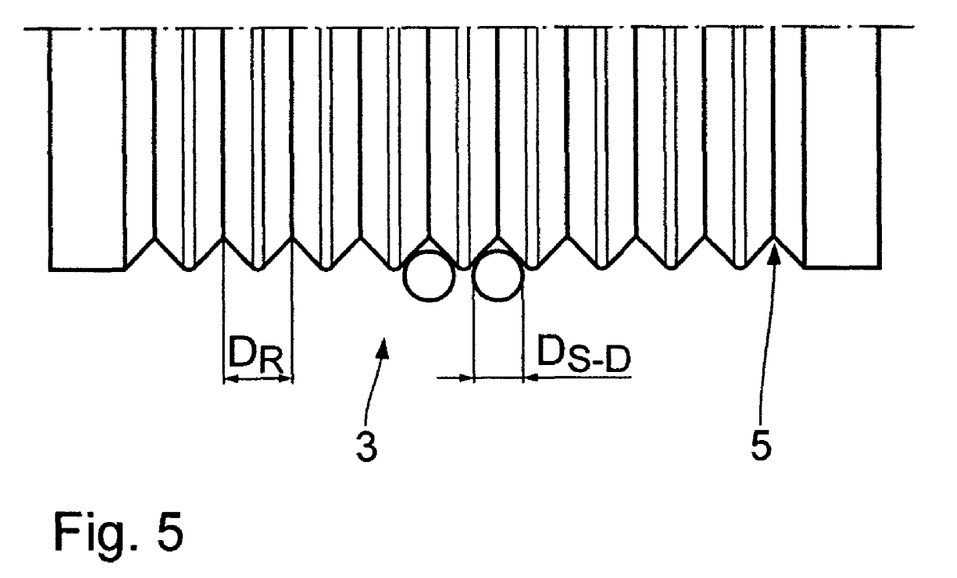
FIG. 5 is an illustration of the guide grooves on the guide roller.

The sawing device 1 comprises a cutting element configured as a cutting wire 2. The cutting wire 2 has a diameter $D_{S-D}$ of no more than 0.5 mm, in particular no more than 0.25 mm. The cutting wire 2 is drivably mounted on the guide rollers 3. A drive device 4, which is only shown diagrammatically, is provided for driving the cutting wire 2. The cutting wire 2 is exactly positioned by means of several guide grooves 5 which are provided on the radial surface of each guide roller 3. It is in particular intended for each guide roller 3 to comprise at least three, in particular at least five, in particular at least ten guide grooves 5. When measured from center to center, adjacent guide grooves 5 have a distance $D_R$ in the range of 1 mm to 5 mm, in particular in the range of 1.5 mm to 2.5 mm, preferably in the range of 1.9 mm to 2.1 mm. The cutting wire 2 is in particular positionable in the guide grooves 5 of the guide rollers 3 in such a way that the cutting wires 2 crossing in the frame 8 form a square pattern for columns to be cut with a square cross-section. The guide grooves 5 have a triangular cross-section. They may however also be configured in the shape of a U, in other words they may be rounded.

The guide rollers 3 comprising the guide grooves 5 are part of a guide device 6. The arrangement of the cutting wire 2 in the guide grooves 5 of the guide rollers 3 allows the cutting wire 2 to be aligned along a predetermined path by means of the guide device 6.

The sawing device 1 further comprises a monitoring device 7 for monitoring the position of the cutting wire 2. Finally, the sawing device 1 comprises a control device 10 which is connected to the monitoring device 7 in such a way as to allow the transmission of data. The control device 10 is in particular a programmable logic controller (PLC). The drive device 4 is controllable by means of the control device 10. The drive device 4 is in particular stoppable by a disable instruction from the control device 10.

In order to improve usability, the control device 10 can be connected to an input unit 11 in such a way as to allow the transmission of data. The input unit 11 is preferably a PC.

Figure 3:
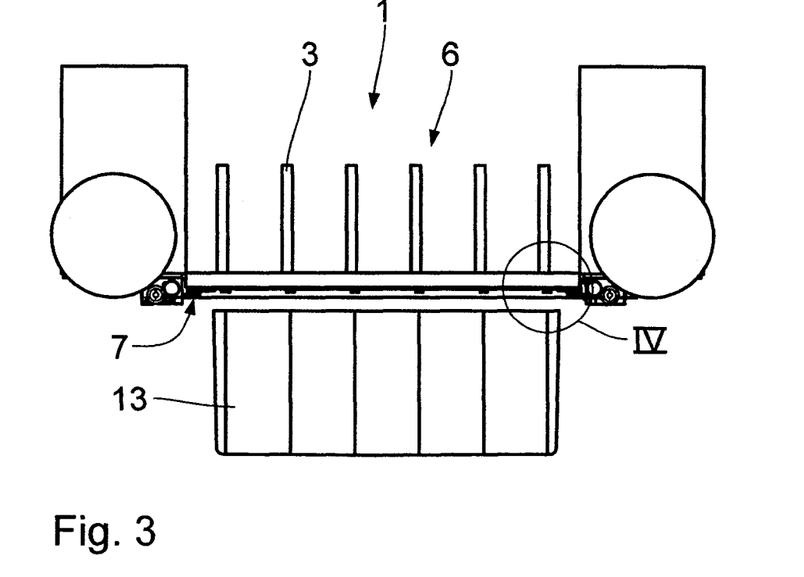
FIG. 3 is a sectional view along line III-III of the section according to FIG. 1.

The following is a more detailed description of the monitoring device 7. The monitoring device 7 is an independent, in particular retrofittable module. The monitoring device 7 comprises four identical wire position detection units 12 which are in each case arranged parallel to one of the sides of the frame 8 between one of the guide rollers 3 and the ingot 13 to be cut. Each wire position detection unit 12 comprises an index bar 14 one end of which is mounted in a detector block 15 while the other end thereof is mounted in a counter bearing 16, with the index bar 14 being displaceable along its longitudinal axis.

Figure 6:
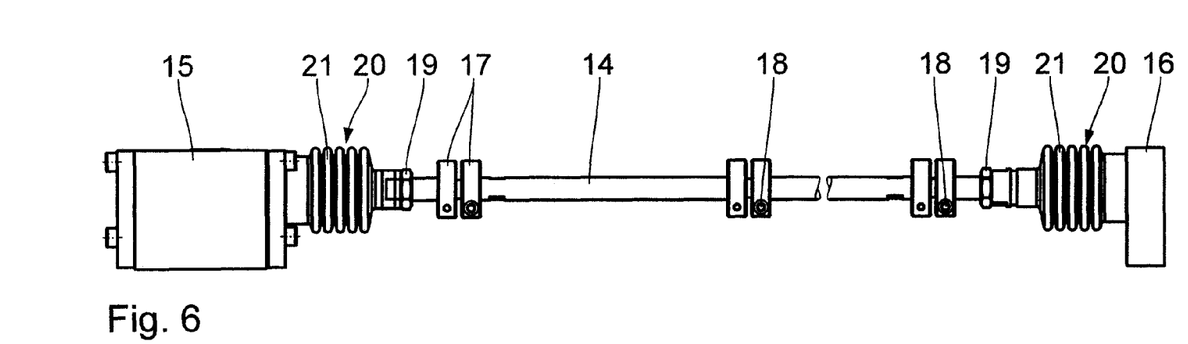
FIG. 6 is a view of a guide rod of the monitoring device.
Figure 8:
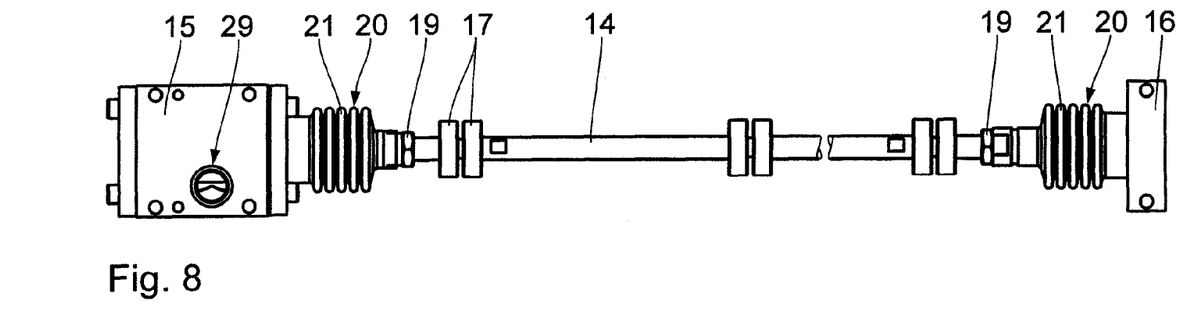
FIG. 8 is a view of the guide rod according to FIG. 6 which has been rotated through 90°.

The position of the index bar 14 is finely adjustable along its longitudinal axis by means of in each case one adjustment nut 19 which is provided on either end thereof. By means of the adjustment nut 19, the index bar 14 is in each case supported in a receptacle 20 on the detector block 15 and on the counter bearing 16.

Figure 7:
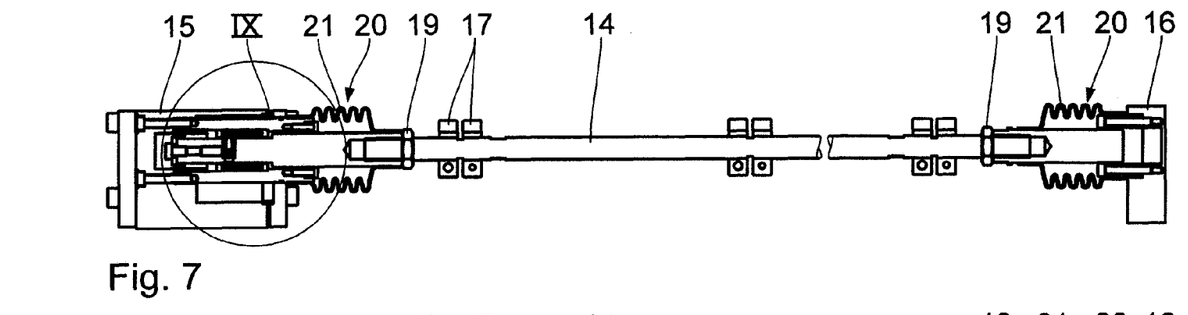
FIG. 7 is a section through the guide rod according to FIG. 6.

The index bar 14 is mounted in the detector block 15 and in the counter bearing 16 in a completely enclosed manner. The index bar 14 is hermetically sealed to the outside, in particular to prevent the entrance of liquid and/or gas. This reliably prevents contamination of the mechanics of the monitoring device 7 on the one hand and of the ingot 13 to be cut on the other. One flexible sealing element 21 is in each case arranged around the receptacle 20. The sealing element 21 is corrugated. It consists in particular of plastics and ensures that the receptacle 20 of the index bar 14 in the detector block 15 and in the counter bearing 16 is hermetically sealed to the outside.

Figure 4:
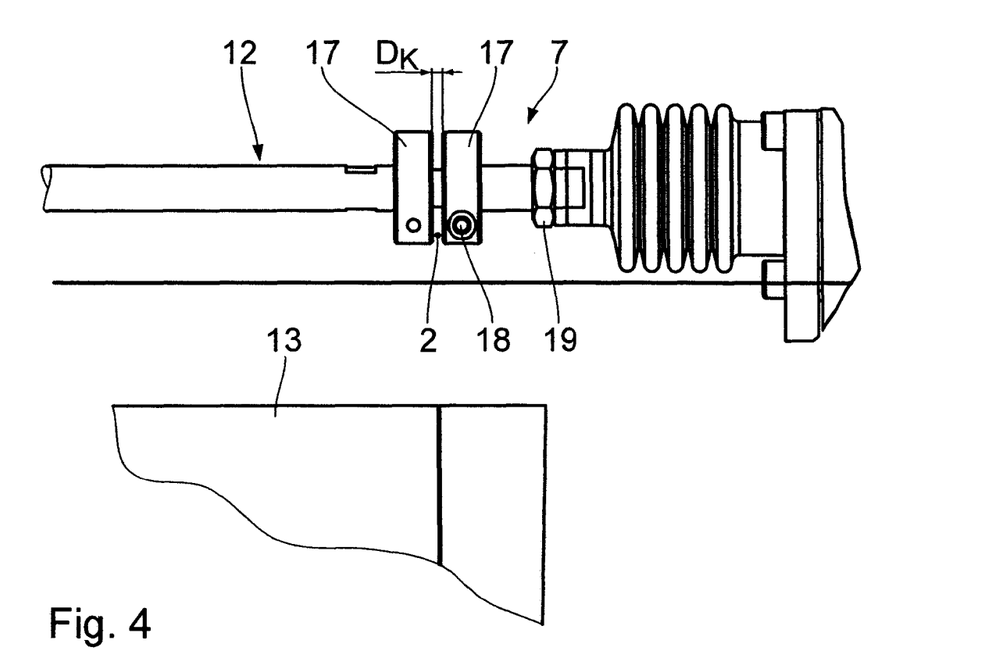
FIG. 4 is an enlarged sectional view of the region IV in FIG. 3.

Several guide plates 17 are provided on the index bar 14 which are in each case arranged in pairs. The guide plates 17 are disc-shaped. The pairs of guide plates 17 have a distance $D_K$ which is greater than the diameter $D_{S-D}$ of the cutting wire 2. The distance $D_K$ is smaller than twice the distance $D_R$ of two adjacent guide grooves 5, $D_K<2\times D_R$, with in particular $D_K\leq 1.5\times D_R$.

The number and arrangement of the pairs of guide plates 17 corresponds exactly to the number and arrangement of the guide rollers 3. One pair of guide plates 17 is in particular allocated to each guide roller 3 for monitoring the position of the cutting wire 2 guided over this guide roller 3. Correspondingly, in each case one index position of the index bar 14 is allocated to each guide groove 5. In other words, the number of index positions of the index bar 14 corresponds exactly to the number of guide grooves 5 on the associated guide rollers 3. The pairs of guide plates 17 are arranged on the index bar 14 in such a way that when the position of the guide grooves 5 on the guide rollers 3 is projected on the index bar 14 in a direction perpendicular thereto, said projection is located exactly in the center between the two guide plates 17 of a pair of guide plates 17 when the index position of the index bar 14 is adjusted accordingly.

The guide plates 17 are displaceable along the index bar 14. Their position is thus flexibly adaptable to the arrangement of the guide rollers 3 of the sawing device 1. They are lockable in the direction of the index bar 14 by means of locking screws 18.

Both the guide plates 17 and the index bar 14 consist of a conductive material. They consist in particular of metal.

Figure 9:
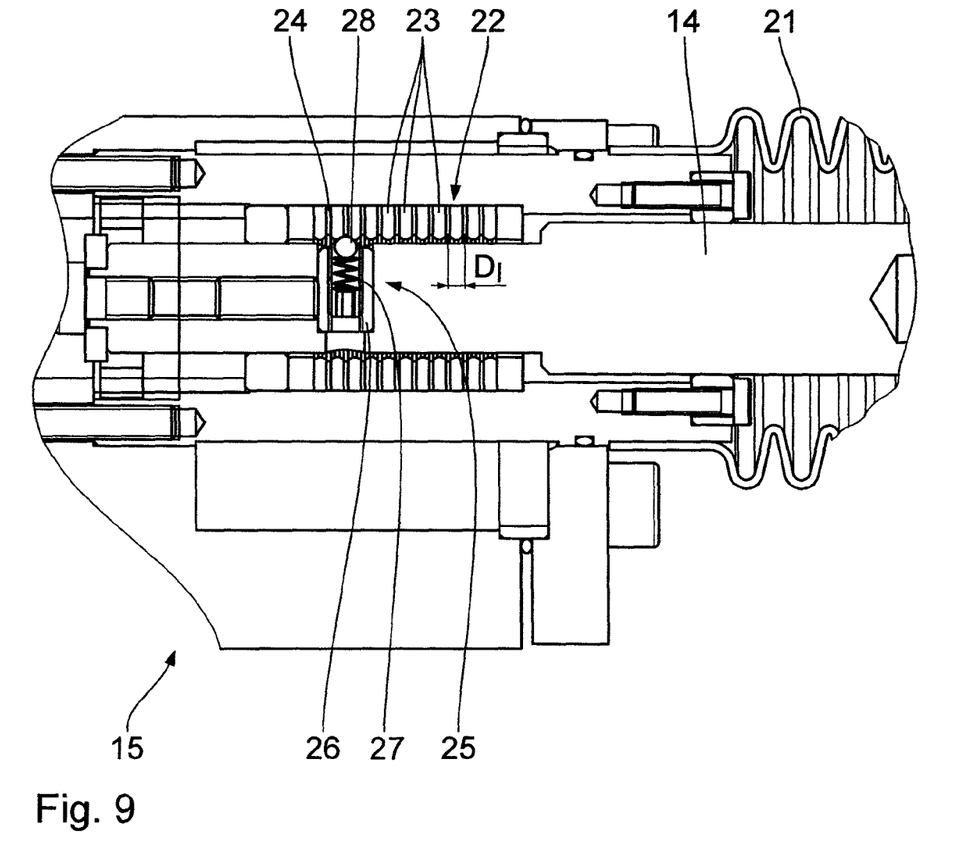
FIG. 9 is an enlarged sectional view of the region IX of FIG. 7.

The index bar 14 cooperates with a ratchet 22 in the detector block 15. The ratchet comprises several ratchet discs 23 which are arranged parallel to each other. An index position 24 is formed between in each case two ratchet discs 23, with a latching element 25 arranged on the index bar 14 being latchable into said index position 24. The number of index positions 24 corresponds exactly to the number of guide grooves 5. Two adjacent index positions 24 are arranged at a distance $D_I$ from each other which corresponds exactly to the distance $D_R$ between two adjacent guide grooves 5, $D_I=D_R$.

The latching element 25 is configured in such a way that it is in each case latchable into the index position 24 between two ratchet discs 23. The latching element 25 is in particular a metal sphere 28 which is displaceably guided in a tubular sleeve 26 against the resistance of a helical compression spring 27.

The ratchet discs 23 consist of an electrically conductive material, in particular of metal, preferably of steel. The metal sphere 28 of the latching element 25 allows an electrical contact to be established between two adjacent ratchet discs 23.

In the detector block 15 is provided a window 29 through which the respective index position 24 of the latching element 25 and therefore the exact position of the index bar 14 is visible. Instead of the window 29, an alternative display of the index position 24 of the latching element 25 can of course be provided as well.

Figure 10:
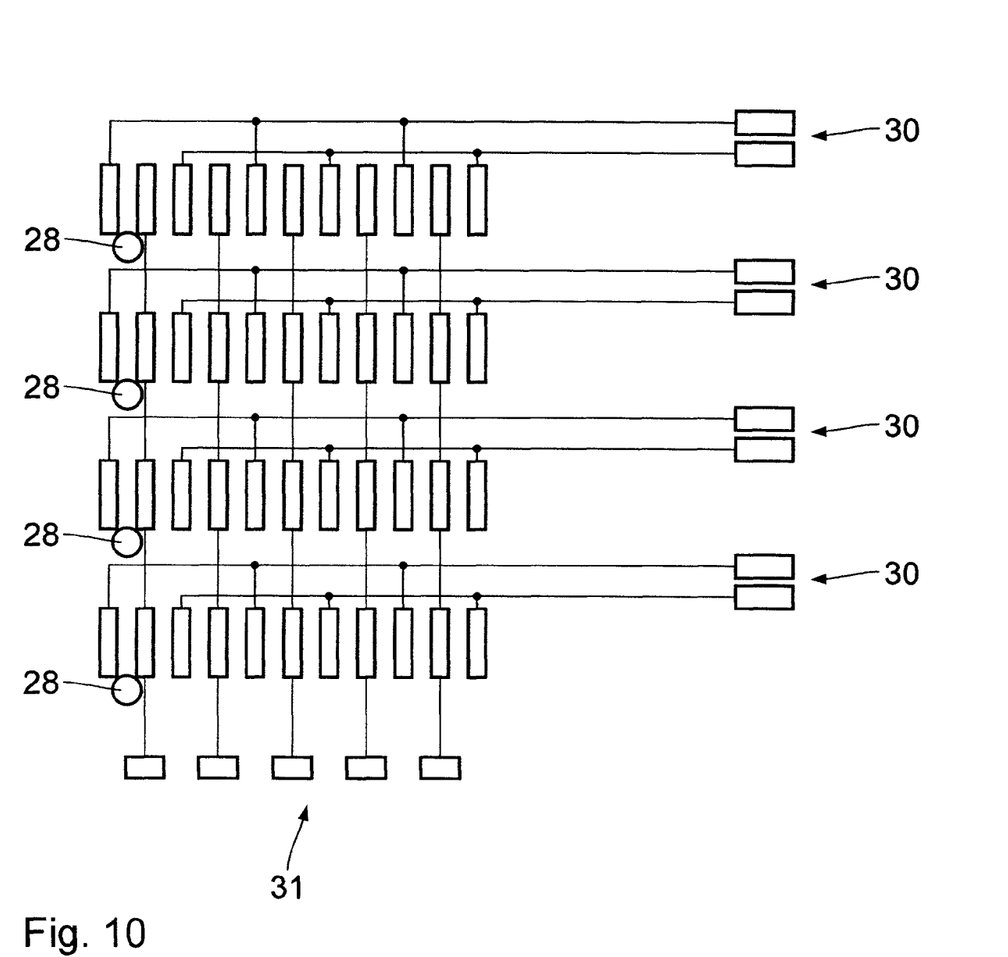
FIG. 10 is a diagrammatic illustration of the electrical wiring of the detector block.

The individual ratchet discs 23 are in each case electrically connected to the control device 10. The wiring between the ratchet discs 23 and the control device 10 is diagrammatically illustrated in FIG. 10. The adjacent ratchet discs 23 of a detector block 15 are in each case alternately connected to inputs 30 and outputs 31 of the control device 10. In each case one of the outputs 31 is connected to the ratchet discs 23 of the four wire position detection devices 12, with said ratchet discs 23 corresponding to each other in terms of their position. In particular the first output 31 is thus in each case electrically connected to the second ratchet disc 23 of each of the four wire position detection units 12, the second output 31 to the fourth ratchet discs 23, the third output 31 to the sixth ratchet discs 23, the fourth output 31 to the eighth ratchet discs 23 and the fifth output 31 to the tenth ratchet discs 23. Correspondingly, in each case the first, fifth and ninth ratchet disc 23 of in each case one wire position detection unit 12 is electrically connected to one of the inputs 30 while in each case the third, seventh and eleventh ratchet disc 23 of in each case one of the wire position detection units 12 is electrically connected to another one of the inputs 30 of the control device 10. The control device 10 therefore comprises eight inputs 30. The control device 10 thus allows one to easily determine the index position 24 of the metal spheres 28 and therefore the exact position of all of the for index bars 14 by sequentially actuating the outputs 31 and evaluating the responding inputs 30.

The index bars 14 of the wire position detection units 12 allow a desired position to be defined for the cutting wire 2. If the position thereof deviates from said desired position defined by means of the index bars 14, the cutting wire 2 abuts at least one of the guide plates 17. A deviation of the actual position of the cutting wire 2 from the defined desired position is thus detectable from a body contact between at least one of the guide plates 17 and the cutting wire 2 and triggers a signal from the control device 10 which causes the sawing device to stop.

When the actual position of the cutting wire 2 coincides with the desired position defined by means of the monitoring device 7, the cutting wire 2 makes no contact with any of the guide plates 17 of the four wire position detection devices 12.

In order to obtain columns with a particular cross-section, in particular a square cross-section, when cutting the ingot 13, the positions of the index bars 14 need to be adapted to each other. To this end, the control device 10 is coupled to the monitoring device 7 in such a way that the operation of the sawing device 1 is disabled when at least one of the index bars 14 is in an unwanted position.

The following is a description of a method of sawing the ingot 13, in particular a silicon block, by means of the sawing device 1 according to the invention. In a first step, the user may optionally define the cross-sectional dimensions of the columns to be cut. Depending on these dimensions, the guide rollers 3 are appropriately positioned on the guide shafts 9. If the guide rollers 3 are stationarily mounted on the guide shafts 9, this step is of course omitted.

The user then selects the respective guide groove 5 into which the cutting wire 2 is to be inserted. As the guide grooves 5 are subjected to wear when the sawing device 1 is in use, it is necessary from time to time for the cutting wire 2 to be inserted into in each case new guide grooves 5 which have so far not been used. In order to select the guide grooves 5, the index bars 14 of the four wire position detection units 12 are moved to the desired index position 24 in the detector block 15. In this way, a desired position is defined for the cutting wire 2 by means of the monitoring device 7. The control device 10, which is coupled to the monitoring device in such a way as to allow the transmission of data, enables the operation of the sawing device 1 only in those cases where all index bars 14 are in an allowed position. The allowed positions are those positions by means of which a cross-section of the columns to be cut is obtainable according to user requirements. The respective position of the four index bars 14 is preferably visible directly via the input unit 11. It is preferably conceivable as well for the positioning of the four index bars 14 to be controlled automatically by means of the input unit 11. The desired position, which is defined by the monitoring device 7, determines the respective guide groove 5 of the guide rollers 3 the cutting wire 2 needs to be placed in so as to avoid contact with one of the guide plates 17. If the cutting wire 2 is wrongly placed on the guide rollers 3 in at least one position, in other words the cutting wire 2 is not in one of the desired positions defined by means of the wire position detection unit 12, the cutting wire 2 will come into contact with at least one of the guide plates 17; this contact will then be detected as a body contact between the cutting wire 2 and said guide plate 17, i.e. a body contact will be established between the cutting wire 2 and the monitoring device 7. The input unit 11 preferably comprises a display which indicates the side and/or the guide plates 17 where said body contact has occurred. This allows the monitoring device 7 to monitor the correct positioning of the cutting wire 2. In this process, the monitoring device 7 generates a signal depending on the actual position of the cutting wire 2. The signal may be an optical and/or acoustic signal. A deviation of the actual position of the cutting wire 2 from the desired position is in particular indicated by a signal which is triggered by a body contact between the cutting wire 2 and at least one of the guide plates 17. Furthermore, the operation of the sawing device 1 is disabled if the actual position of the cutting wire 2 deviates from the desired position. The user will then correct the position of the cutting wire 2 in the guide grooves 5 as required.

During the sawing process, the position of the cutting wire 2 is continuously monitored by means of the monitoring device 7. If the cutting wire 2 deviates from the desired position defined by the four wire position detection units 12, this leads to a body contact with the monitoring device 7 as described above, thus resulting in a machine stop of the sawing device. Correspondingly, an unwanted displacement of one of the index bars 14 will result in a machine stop of the sawing device 1 as well.

The monitoring device 7 eliminates user errors when placing the cutting wire 2 on the guide rollers 3, which results in obvious economical advantages.

What is claimed is:

1. A sawing for sawing silicon blocks, the sawing device comprising:
   at least one cutting element for sawing silicon blocks, said at least one cutting element being drivable by means of a drive device;
   at least one guide device, the at least one cutting element being alignable along a predetermined path by means of the at least one guide device; and
   at least one monitoring device for monitoring the position of the at least one cutting element, wherein the monitoring device comprises at least one index bar with guide plates arranged thereon.

2. A sawing device according to claim 1, wherein the cutting element abuts at least one of the guide plates in the event of a deviation from a definable desired position.

3. A sawing device according to claim 1, wherein the index bar is mounted in at least one detector block.

4. A sawing device for sawing silicon blocks, the sawing device comprising:
   a drive device;
   a cutting element for sawing silicon blocks, said at least one cutting element being driven via said drive device;
   a guide device, said cutting element being aligned with a predetermined path via said guide device; and
   a monitoring device for monitoring a position of said cutting element, said monitoring device comprising at least one index bar with guide plates arranged thereon.

5. A sawing device according to claim 4, wherein said cutting element abuts at least one of said guide plates in the event of a deviation from a definable desired position.

6. A sawing device according to claim 4, wherein said at least one index bar is mounted in at least one detector block.

7. A sawing device according to claim 1, wherein the monitoring device is an independent module.

8. A sawing device according to claim 7, wherein the monitoring device is a retrofittable module.

9. A sawing device according to claim 1, wherein the at least one monitoring device comprises at least one of the group comprising an optical and an acoustic signal unit for displaying the position status of the at least one cutting element.

10. A sawing device according to claim 9, wherein the at least one monitoring device comprises at least one of the group comprising an optical and an acoustic signal unit for displaying a deviation of the position of the at least one cutting element from a desired position.

11. A sawing device according to claim 1, wherein the cutting element is a cutting wire.

12. A sawing device according to claim 11, wherein the at least one guide device comprises guide rollers with several guide grooves which are arranged at a distance from each other for positioning the cutting wire.

13. A sawing device according to claim 1, wherein the monitoring device is coupled to a control device by means of which the drive device is controllable.

14. A sawing device according to claim 13, wherein the monitoring device is coupled to a control device by means of which the drive device is stoppable.

* * * * *